(12) United States Patent
Pickrell

(10) Patent No.: US 12,150,441 B1
(45) Date of Patent: Nov. 26, 2024

(54) PEST CATCHER

(71) Applicant: David J Pickrell, Centre Hall, PA (US)

(72) Inventor: David J Pickrell, Centre Hall, PA (US)

( * ) Notice: Subject to any disclaimer, the term of this patent is extended or adjusted under 35 U.S.C. 154(b) by 226 days.

(21) Appl. No.: 17/220,492

(22) Filed: Apr. 1, 2021

(51) Int. Cl.
 *A01M 3/02* (2006.01)

(52) U.S. Cl.
 CPC .................................. *A01M 3/022* (2013.01)

(58) Field of Classification Search
 CPC ........ A01M 3/022; A01M 3/04; A01M 3/002; A01M 3/00; A01M 1/14; A01M 3/02
 See application file for complete search history.

(56) References Cited

U.S. PATENT DOCUMENTS

| | | | | |
|---|---|---|---|---|
| 4,759,150 A | * | 7/1988 | Pierce | A01M 3/022 43/136 |
| 5,131,178 A | * | 7/1992 | Stoliar | A01M 3/002 43/12 |
| 5,537,777 A | * | 7/1996 | Geeting | A01M 3/00 15/119.1 |
| 10,178,862 B1 | * | 1/2019 | Pickrell | A01M 3/00 |
| 2018/0303080 A1 | * | 10/2018 | Shasha | A01M 3/04 |

* cited by examiner

*Primary Examiner* — Darren W Ark
*Assistant Examiner* — Sahar Almatrahi
(74) *Attorney, Agent, or Firm* — John J. Elnitski, Jr.

(57) ABSTRACT

A pest catcher adapted to catch and contain a pest. The pest catcher includes a bag to contain the pest. The pest catcher includes a head to receive attachment of the bag to the head and manipulate the bag. The pest catcher includes a handle attached to the head, the handle for manipulating the head and the bag. The pest catcher includes a sticky substance with adhesive properties attached to the bag, the sticky substance facing outward from the head that is adapted to contact the pest during the capture phase of the use of the pest catcher.

5 Claims, 20 Drawing Sheets

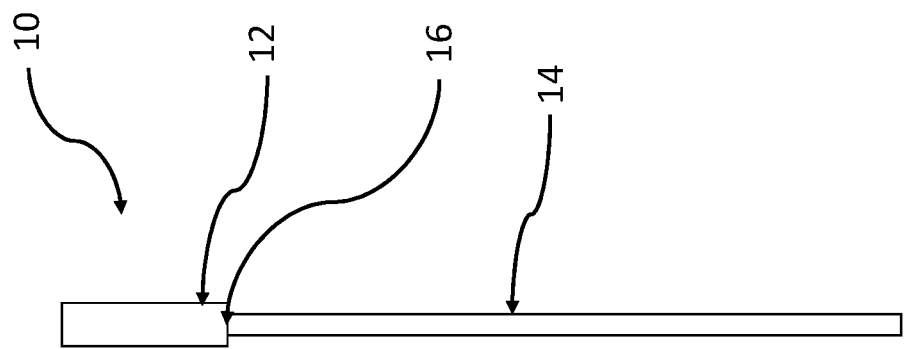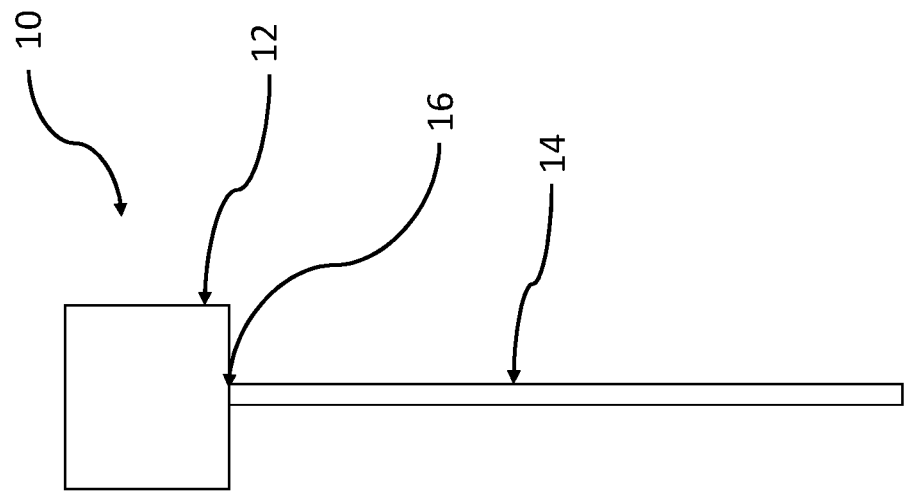
Fig. 2

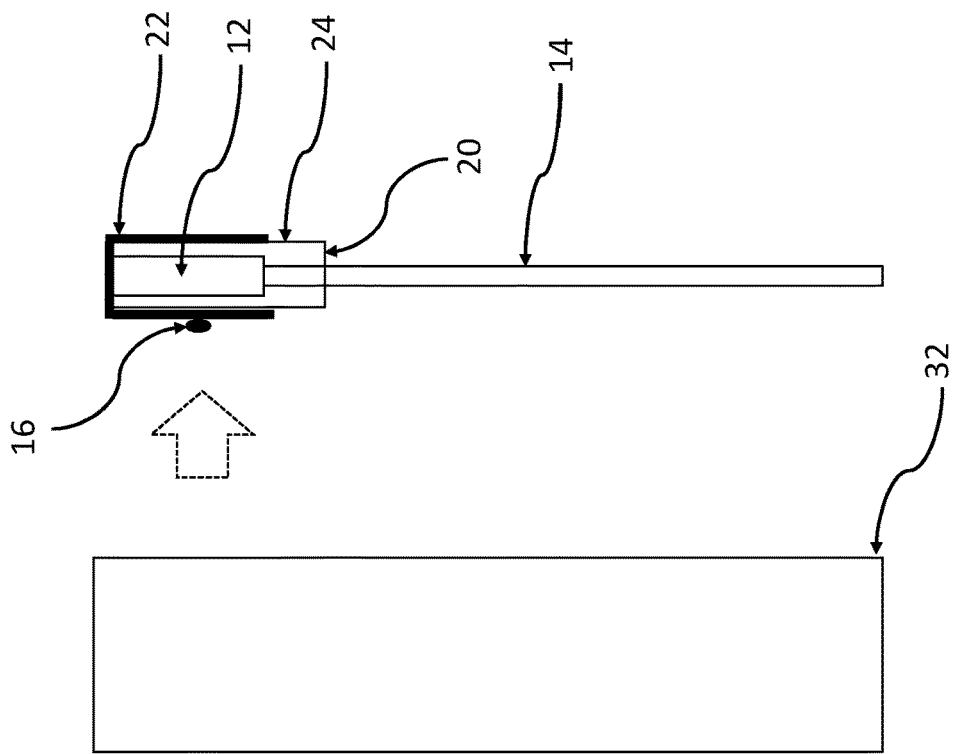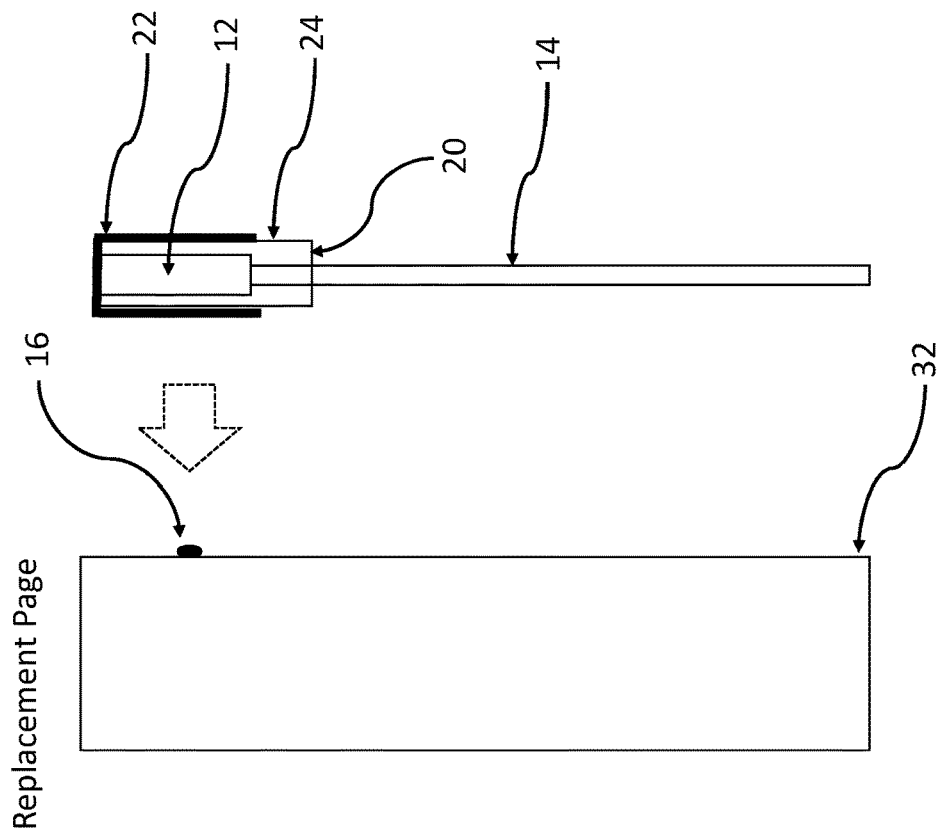
Fig. 4

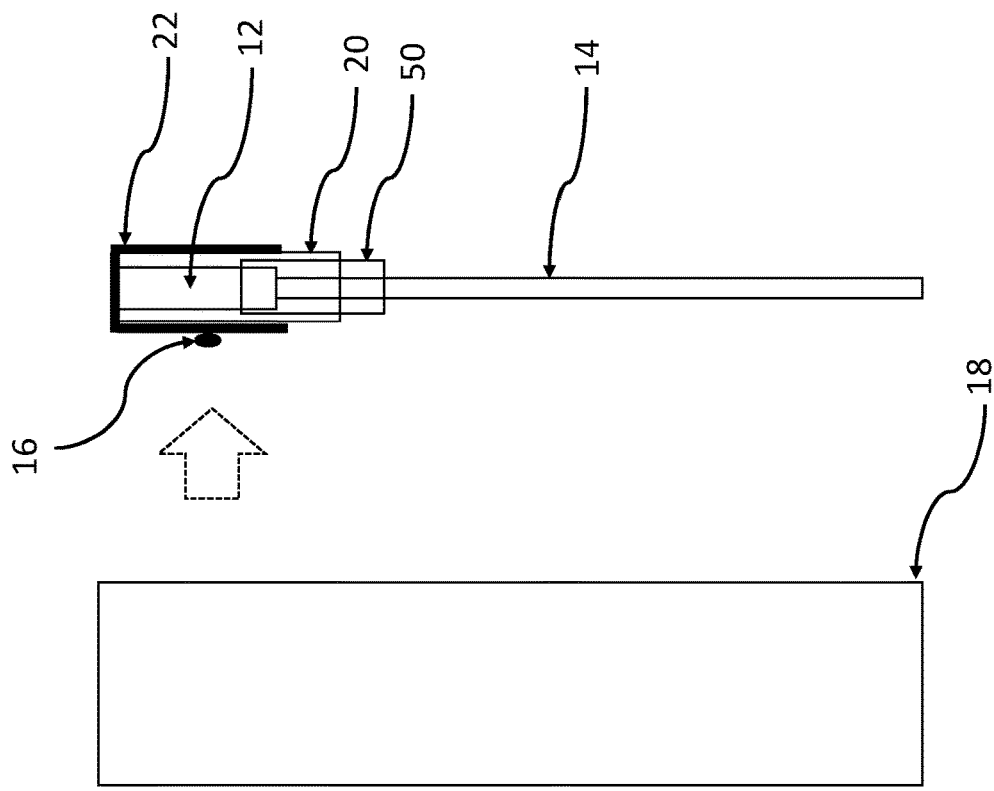
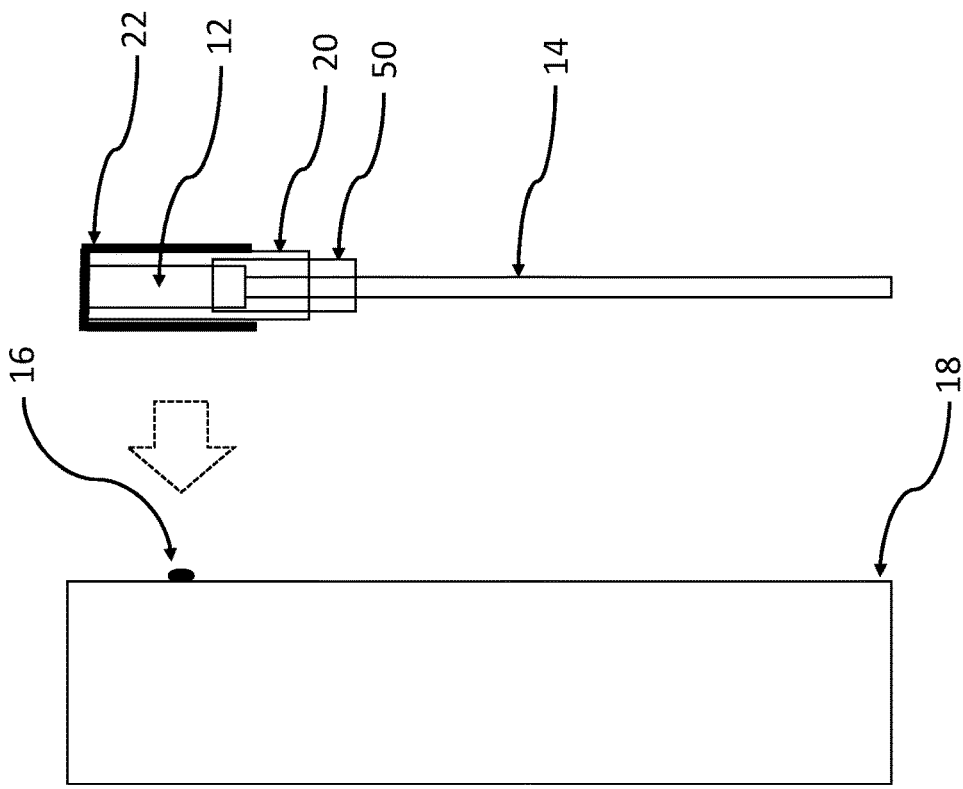
Fig. 13

PEST CATCHER

BACKGROUND

The field of invention generally relates to pest control. More specifically, the present invention relates to pest capture and disposal using a device.

Pests are known to enter areas where it is undesirable to have them. Examples of such areas are inside the living, sleeping, & dining spaces in the home; in garages, basements, porches, decks, yards; and various businesses including offices, factories, commercial businesses, retail business, farms, etc. Pests include crawling insects for example cockroaches and flying insects such as wasps; reptiles such as snakes; arachnids such as scorpions and spiders; mammals such as mice, as well as many others. These pests can be poisonous and hence dangerous or nonpoisonous and just a nuisance. Examples of poisonous pests include brown recluse or black widow spiders, scorpions, rattlesnakes and some types of caterpillars.

There are many products available for preventing pests from entering into unwanted areas or removing them when they do appear. These can be divided into two main categories depending on whether a user must operate the device at the time the pest is captured or killed. The first category of products is made up of devices or chemicals used for killing or capturing pests and work automatically or continuously while a person is not around. Included in this category are insecticides sprayed over surfaces by exterminators or by the homeowner, bug zappers, roach bags, fly paper, mouse traps, etc. Some of these attract the pests with bait and others are just applied to surfaces the pests normally occur and various means are used to kill the pest including immobilization using adhesive, electrifying, or killing with chemicals. The second category of products is made up of devices or chemicals for manually killing or removing a pest once it has been spotted by a user. These include insecticide spray which is applied directly to the insect, flyswatters, insect vacuums, etc. All of the approaches and devices in this second category involve the manual killing or removing of pests from unwanted areas and suffer from major disadvantages.

One common way for a homeowner to kill an pest is to crush the pest by hand using toilet paper, Kleenex, paper towel, etc. . . . The problems with this method are obvious and include the requirement to come close to the pest and risk being stung or bitten; having the pest fall on the homeowner if reaching above their head; missing the pest because it can see you coming close to it; feeling the crushing sensation (which some find distasteful); and the difficulty in finding the pest in the tissue to be sure it was captured and killed. In addition, in many instances the pest is difficult to reach with a hand-held tissue. This may because the pest is located high on a wall or on the ceiling, which requires the homeowner to reach it by standing on a chair, coffee table, step ladder, etc. . . . A pest may also be hard to reach because it is located behind an object such as a sink pedestal, toilet, couch, etc. A second very common device used to kill pests is the common household fly swatter. The major problems associated with this are the swatter smashes the pest on the surface leaving residue on the surface and on the fly swatter. The swatter is also not good for killing pests in corners or crevices or irregular surfaces.

It is an object to provide a device for capturing and disposal of pests.

SUMMARY OF THE INVENTION

A pest catcher adapted to catch and contain a pest. The pest catcher includes a bag to contain the pest. The pest catcher includes a head to receive attachment of the bag to the head and manipulate the bag. The pest catcher includes a handle attached to the head, the handle for manipulating the head and the bag. The pest catcher includes a sticky substance with adhesive properties attached to the bag, the sticky substance facing outward from the head that is adapted to contact the pest during the capture phase of the use of the pest catcher.

BRIEF DESCRIPTION OF DRAWINGS

FIG. 2 is a front and side view of the pest catcher according to the present invention.

FIG. 4 is a side view of the pest catcher according to the present invention.

FIG. 13 is a side view of the pest catcher according to the present invention.

DETAILED DESCRIPTION

The present invention is a pest catcher for capturing and disposal of pests. The pest catcher provides for a quick and convenient way of capturing, containing and disposing of unwanted pests in the home and business. In addition, the pest catcher can be made at low cost. The pest catcher includes a handle assembly to receive and manipulate a bag for capturing pests. The pest catcher includes a bag to capture and dispose of a pest without an operator of the handle assembly contacting the pest, the bag is removably attached to the handle assembly. The bag is adapted to have direct contact with the pest to be captured. The pest catcher further provides for the bag to be inverted around the entire pest or the head of a larger pest such as a snake after its capture to encapsulate and render it harmless for disposal.

The pest catcher of FIGS. 1-7 includes two main components. The first component is a replaceable and disposable bag 20 used to capture the pest for disposal. The second component is a reusable handle assembly 10 to hold and actuate the bag 20. The pest catcher further provides for the bag 20 to be inverted around the entire pest or the head of a larger pest such as a snake after its capture to encapsulate and render it harmless for disposal.

Figure 1:
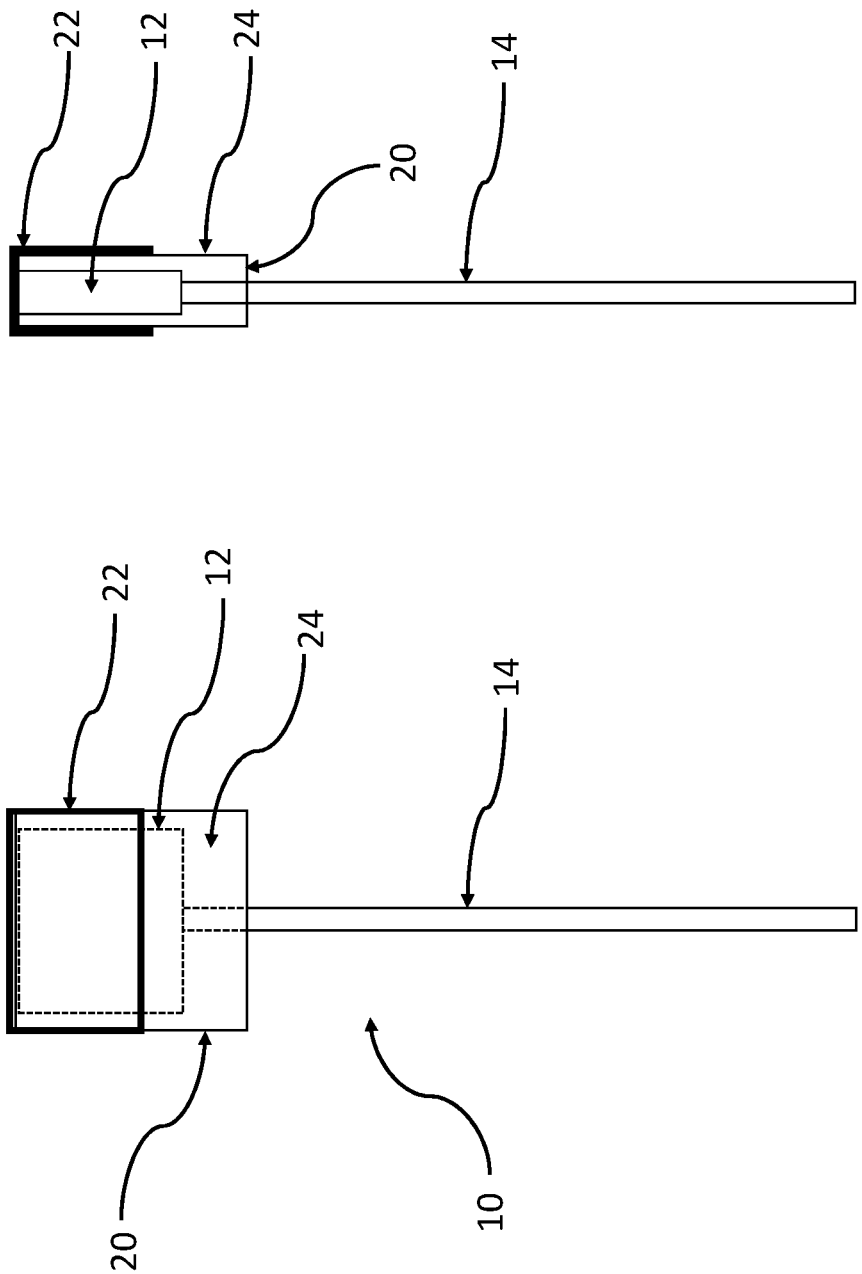
FIG. 1 is a front and side view of the pest catcher according to the present invention.

FIG. 1 shows front and side views of a disposable bag 20 with sticky layer substance 22 on a surface of the bag 20. The bag 20 is held on handle head 12 of reusable handle assembly 10. FIG. 2 shows the details of the reusable handle assembly of the pest catcher. The handle assembly 10 includes a handle 14 and a handle head which is shown as a rectangular plate. The handle head 12 is rigidly attached to the handle 14 at 36. Attachment of the handle head 12 and handle 14 at 36 could be a temporary attachment, such as screwing the handle head 12 onto handle 14 having a threaded end. The handle head 12 could also be permanently attached to handle, for example if the handle head 12 and the handle were molded as one piece. If a temporary attachment of the handle 14 to the handle head 12 is used, then different shaped handle heads could be used to capture different types of pests.

The handle 14 is the portion of the handle assembly 10 that the user holds to manipulate the bag 20 to capture the pest. The handle 14 is typically a round hollow metal or plastic tube. The handle 14 is hollow so that handle assembly 10 is light weight for easy handling by the user. Handle 14 is rigid so that the user can transfer force from the handle 14 to the plate 12, in order to apply pressure against the pest to be captured. The handle 14 is typically aluminum, steel, PVC or nylon for weight, rigidity and strength. The handle 14 can have a diameter of typically from one half to two inches so that the handle 14 is easy to grip by the user. The pest catcher for home use would typically have a total length of the handle assembly 10 between two to four feet. It is envisioned that handle 14 could have the feature of an adjustable length. The handle 14 could have curved or angled portions to reach around surfaces such as toilets, sinks and couches. The curved or angled sections could be added in the form of quick-change inserts or portions of the handle 14. The handle 14 could be fitted with a flashlight for viewing in a dimly lit room.

The handle head 12 is shown as a thin plate in FIG. 1. The handle head 12 is typically more flexible than handle 14, so the handle head 12 can flex when pressed from an angle against a surface and thereby lay flat against the surface and thereby more easily capture a pest on the surface. However, the handle head 12 is rigid enough to impart force against the pest on the surface during capture. The handle head 12 is typically a flexible plastic or metal of rectangular shape. An example of size of the handle head 12 is four and one-half inches wide by five inches long by quarter inch thick that is composed of polypropylene or polyethylene plastic which is semi rigid.

Figure 3:
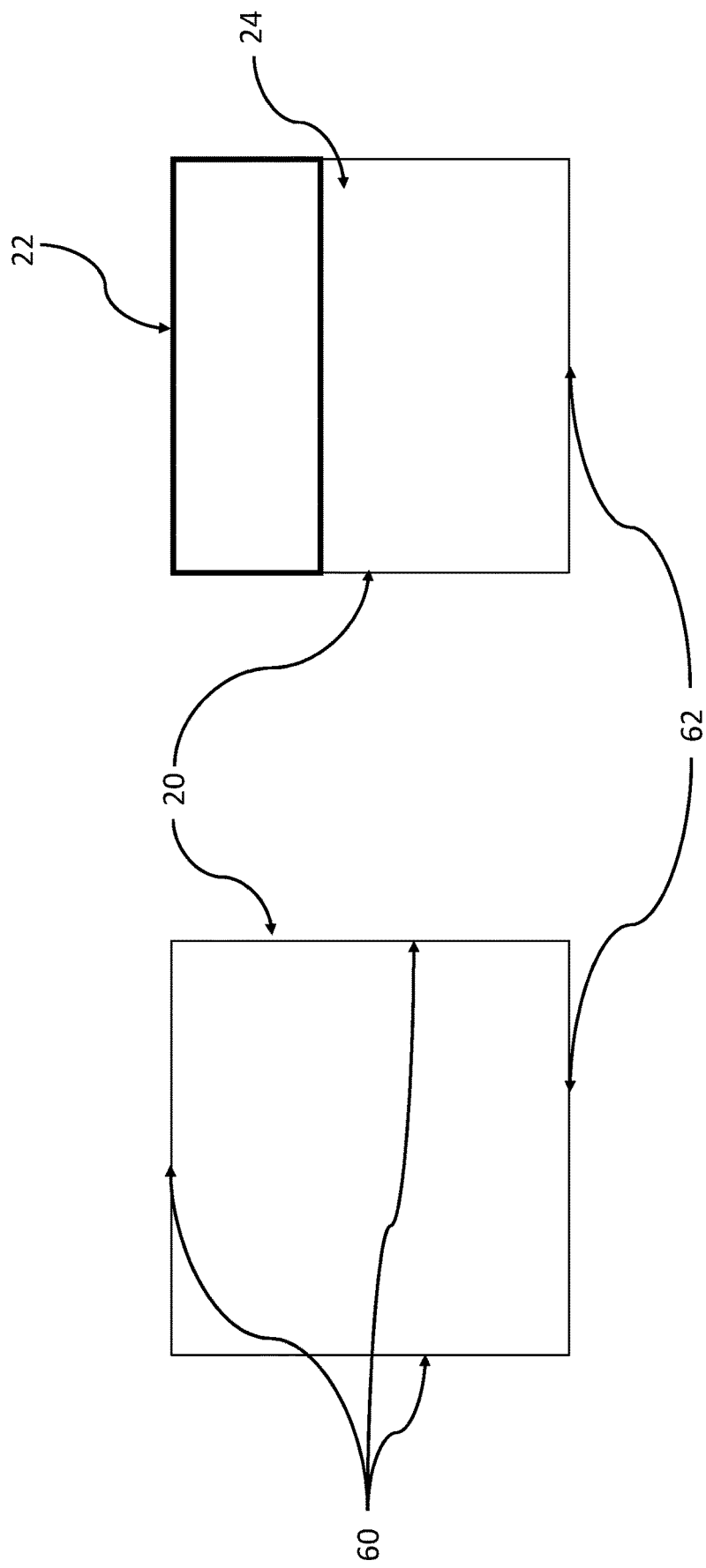
FIG. 3 is a front view of the pest catcher according to the present invention.

FIG. 3 shows the bag 20 as a typical plastic bag having a rectangular shape that is nine inches long by six inches wide. The bag 20 can be a common polypropylene or polyethylene plastic bag. FIG. 3 shows that the bag 20 is sealed along three of its sealed edges 60 and open along one open edge 62. The outer surface 24 of the bag 20 is coated with the sticky substance layer 22 to adhere the pest to the bag 20. Double sided carpet tape has been successfully used as the sticky substance layer 22, but other substances could be also be used. The advantages of the double sided carpet tape are that it can easily be applied uniformly to the bag surface, the carpet tape is very tacky and strong and the carpet tape stays sticky even when exposed to air for months or even years. Since the carpet tape is double sided, one side of the carpet tape can be used to adhere the carpet tape to the bag 20 and the other side used for capturing of the pest. The bag 20 could have various shapes and sizes to match the various shapes and sizes of handle head 12 on handle assembly 10. The bag 20 could be much larger for outdoor use, for example to capturing larger pests or a swarm of smaller ones such as wasps. The bag 20 could be sized to contain just the head of a pest such as a snake in the bag to render it harmless or the bag 20 could be large enough to contain the whole snake.

FIG. 4 shows the operation of the pest catcher of FIG. 1 being used to capture a small pest such as an insect sitting on a surface. FIG. 4 shows bag 20 with a sticky substance layer 22 on a portion of the outer surface of the bag 20. The function of the handle assembly 10 is to hold the bag 20 and keep the pest at a distance from the user. For operation of the pest catcher, the user holds the handle 14. The bag 20 with the sticky substance layer 22 is positioned next to a pest 16 on a surface 18 and the bag 20 is pushed against the pest 16, so that the bag 20 engulfs the pest 16. The bag 20 is withdrawn from the surface 18 with the pest 16 adhered to the bag 20 by the sticky substance layer 22. In this manner of operation, the user does not need to come in contact or even close proximity of the bag 20 during pest capture. After the bag 20 is withdrawn from the surface, the user would inspect the bag 20 to ensure that the pest 16 has been captured on the surface of the bag 20.

Once the pest 16 has been securely captured on the surface of bag 20, the user can decide whether to leave the bag 20 on the handle assembly 10 to capture more pests or to remove and dispose of bag 20 and replace the bag 20 with a new bag 20 on the handle assembly 10. The bag 20 is typically of a sufficient size and has sufficient area of exposed sticky substance layer 22 on the surface of the bag 20 relative to most insects that the pest catcher can be used to capture multiple pests such as insects. This makes the pest catcher much more cost effective than if the pest catcher could only be used to capture one pest. The pest catcher has been used to capture more than ten common house spiders on a single bag 20. A bag cover such as wax paper can be placed over the bag 20 while storing the pest catcher until the next insect is captured so the user does not need to see the previously trapped insects which are unsightly.

The user can decide to remove the bag 20 after a pest 16 is adhered to the bag 20. There are various reasons to replace bag 20 with a fresh bag 20 after capturing a pest. First, if the pest is poisonous or dangerous, the user may want to dispose of it immediately after capturing the pest, even if the pest is the first pest captured with that bag 20. Second, the bag 20 may become too unsightly for the user with multiple dead pests adhered to the surface of the bag 20. Third, as the bag 20 is pressed into various surfaces to capture multiple pests, the exposed portion of the sticky substance layer 22 will eventually diminish in stickiness due to the fact that dust and debris will be picked up from various surfaces. At some point the exposed sticky substance layer 22 will no longer be as effective in capturing more pests and the bag 20 should be replaced. The bag 20 can be attached to the handle head 12 so that as the bag 20 is removed, the bag can be inverted to encapsulate the pest, basically turning the bag 20 inside out as it is removed. A tool can be fashioned to grab the bag 20 and turn the bag 20 inside out.

Figure 5:
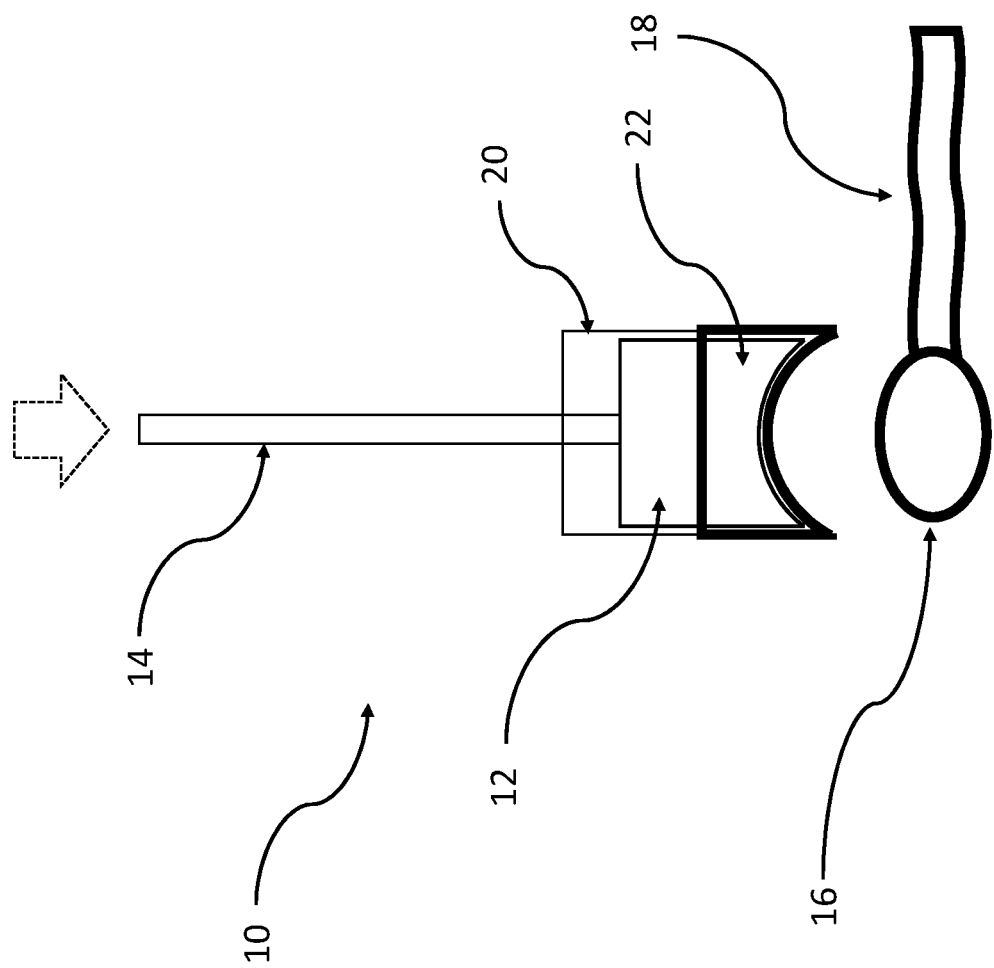
FIG. 5 is a front and side view of the pest catcher according to the present invention.

The handle head 12 can have various shapes and sizes to facilitate capture of certain types of pests. The handle head 12 could be much larger for outdoor or business use, for example for capturing larger pests or a swarm of smaller ones such as wasps. The handle head 12 could be shaped to engulf a pest or portion of a pest. FIG. 5 shows a handle head 12 which is cup shaped for pressing downward onto the head 26 of a snake 28 to crush it or render the snake immobile during capture.

Figure 6:
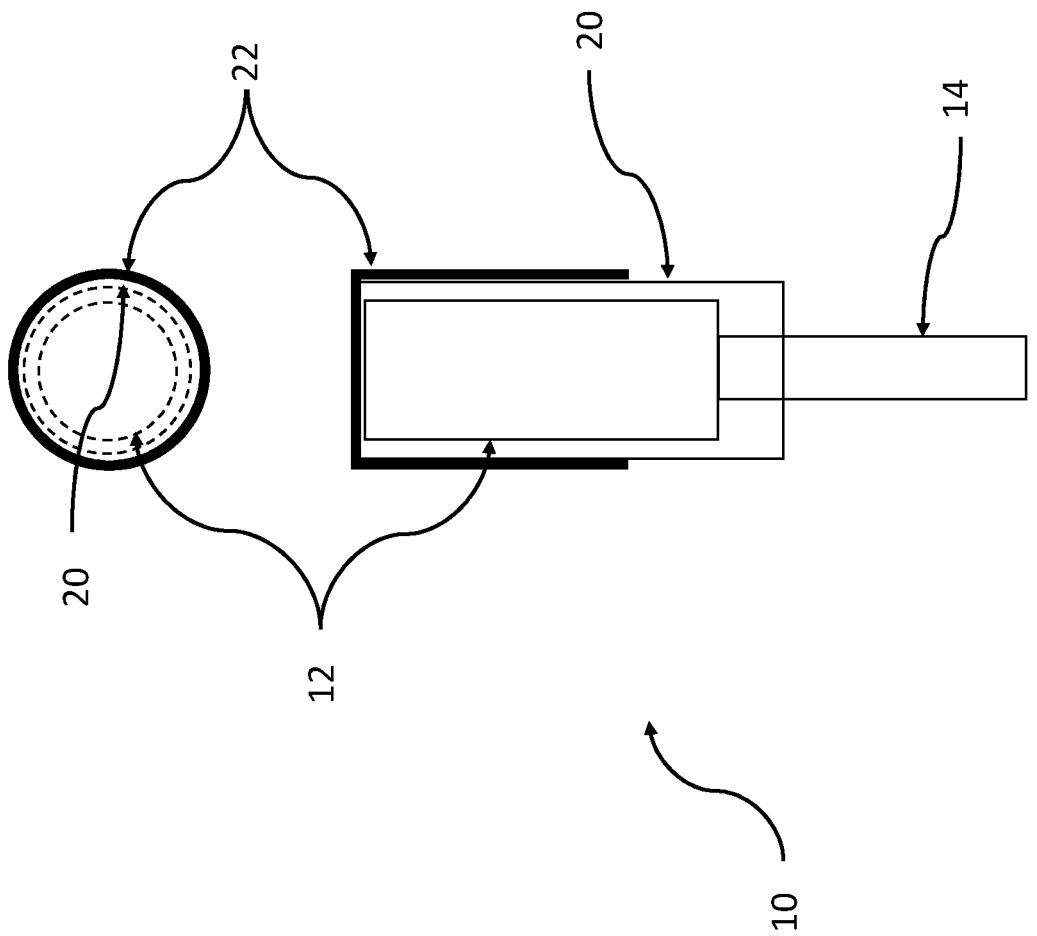
FIG. 6 is a front and side view of the pest catcher according to the present invention.

FIG. 6 shows the handle head 12 as a cylindrical shape that can rotate around the handle 14 that is similar to a typical lint brush roller for removing lint from clothing. The bag 20 on the cylindrical shape handle head 12 would also be cylindrical in shape to fit around the cylindrical shape handle head 12. The bag 20 would rotate with the handle head 12 over various surfaces and the bag 20 would be designed to invert when the bag 20 is removed from the handle 14. The rolling cylindrical shape handle head 12 could be used for example for removing pests such as fleas from furniture and pets by rolling the bag 20 with sticky substance 22 over surfaces. The pest catcher could also be designed with interchangeable handle heads 12 to include a rectangular plate, a cup shaped plate and a cylindrical shape roller. The user could attach the appropriate handle head for the pest to be captured.

One advantage of the pest catcher is that the user can vary the amount of pressure applied to a pest. The amount of pressure applied to the pest during capture will determine the amount of adhesion of the pest to the sticky substance layer 22, as well as if the pest is captured alive or if the pest is crushed and killed. A user may not want to crush and kill the pest during pest capture because its bodily fluids and parts may remain on the surface where the pest is captured, such as a wall, ceiling or table. So, the user can apply a lighter pressure against the pest so that the pest is removed from a surface such as a table but is not crushed and then press the bag 20 with the pest adhered to the bag 20 with greater pressure against another surface such as a floor to crush the pest. A user may also deem the pest is not poisonous or dangerous and is just a nuisance and therefore decide to remove the pest from the area but not kill it. In that case the user would also apply a light pressure to capture the pest from the surface, take the pest to an outdoor area and scrape the pest off of the bag 20 to release the pest. This is a "no kill" application of the pest catcher that is possible for those that do not wish the pest to be harmed, but just removed from the environment the pest is in.

Figure 7:
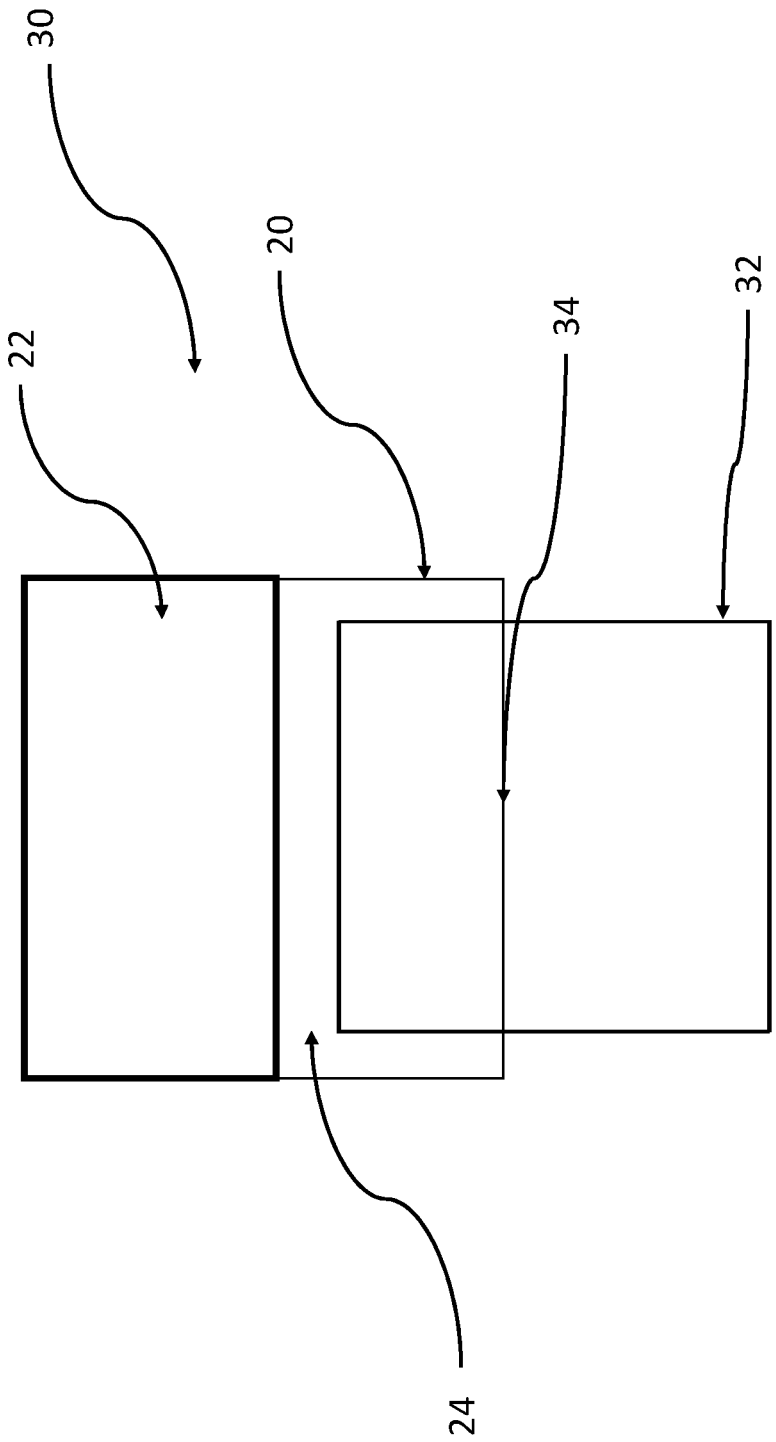
FIG. 7 is a front and side view of the pest catcher according to the present invention.

Usually, the bag 20 with sticky substance layer 22 is typically constructed of a thin plastic that has no rigidity and therefore is easily put on and taken off of the handle head 12. To more easily handle the bag 20, the addition of structural support 32 to the bag 20 is added to the bag 20 to form a removable bag unit 30, as shown in FIG. 7. FIG. shows the bag 20 held and supported by the support 32 to form a disposable bag unit 30. The bag unit 30 includes three parts. The first part is a bag 20. The second part is the sticky substance layer 22 on the outer surface of the bag 20. The third part is a support 32 which holds the bag 20 during shipment, storage, use, and disposal. The support 32 provides structure to the bag 20. The bag 20 is adhesively attached to the support at its edge 34.

Figure 8:
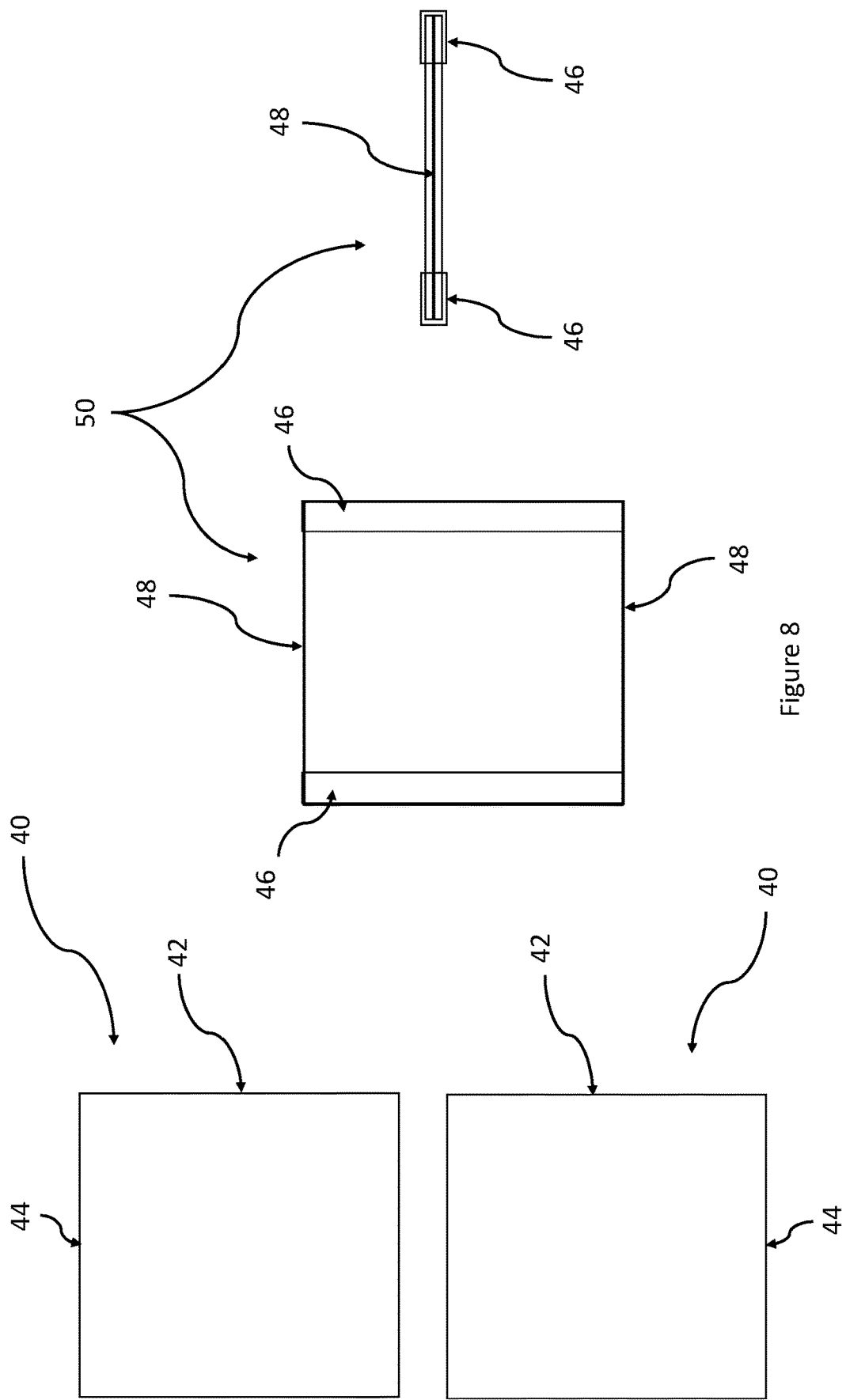
FIG. 8 is a front and side view of the pest catcher according to the present invention.
Figure 9:
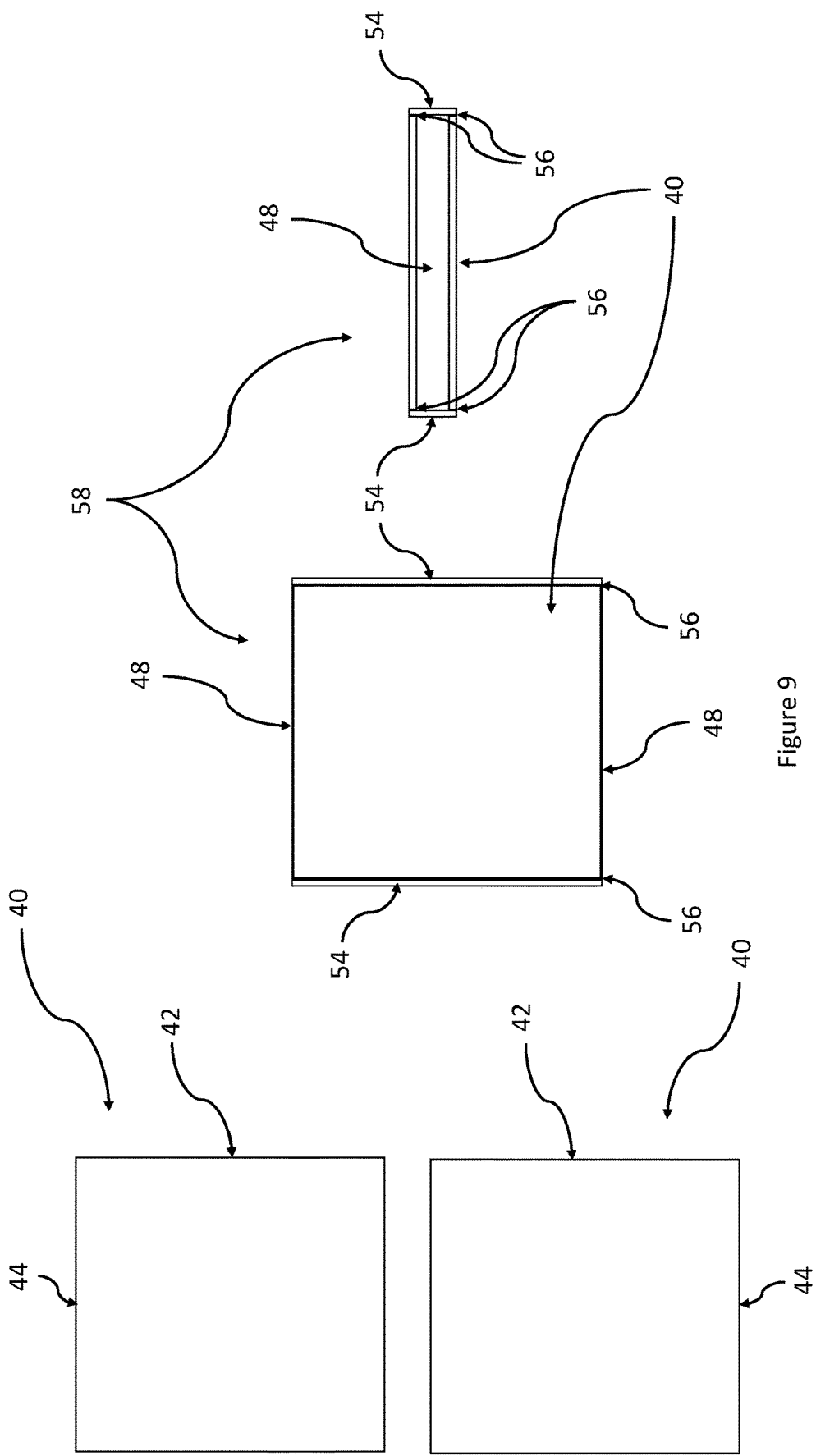
FIG. 9 is a front and side view of the pest catcher according to the present invention.

FIGS. 8 and 9 show the construction of the support 32 of FIG. 7 for the bag unit 30. In FIG. 8 the support 32 is shown as a typical cardboard sleeve 50 having a rectangular shape. The cardboard sleeve 50 is constructed using two cardboard sheets that are typically six inches long on their long sides 42 by five inches wide on the short sides 44 and $\frac{1}{16}$ inch thick. The thickness of the cardboard sheets 40 give the cardboard sleeve 50 rigidity for loading and unloading the bag unit 30 from the handle assembly 10. The cardboard sleeve 50 is constructed by joining both long sides 42 of the two cardboard sheets 40 with tape 46 which wraps around the edges of the long sides 42 as shown in FIG. 8. By bonding the long sides 42 of the cardboard sheets together a sleeve 50 is formed with a narrow opening 48, which is the space between the two cardboard sheets 40 on both short sides 44 of the cardboard sheets 40. Sleeve has two opposite closed sides formed by applying adhesive tape along the two long sides 42 and two opposite open sides where the two short sides 44 have not been taped together.

Alternatively, rather than cardboard sleeve 50 used as the support 32 for the bag unit 30, a cardboard box 58 could be utilized. FIG. 9 shows the construction of cardboard box 58 formed by attaching cardboard side walls 54 to the cardboard sheets of FIG. 8. In this case the cardboard side walls 54 would have typical dimensions of six inches by one-half inch and would be one-sixteenth inch thick. The box 58 could be formed by adhesively attaching the side walls 54 along their six-inch-long sides at joints 56, as shown in FIG. 9. Alternately, the box 58 could be formed by bending a larger cardboard sheet to these dimensions and adhesively attaching just one edge. Cardboard box 58 is essentially cardboard sleeve 50 with a larger one-half inch opening 48. The advantage of the cardboard sleeve 50 over the cardboard box 58 is that the sleeve 50 lays flat which is more compact for shipping of the bag unit 30. The advantage of the cardboard box 58 is that the box 58 can be placed onto handle head 12 more easily because of the larger opening 48.

Figure 10:
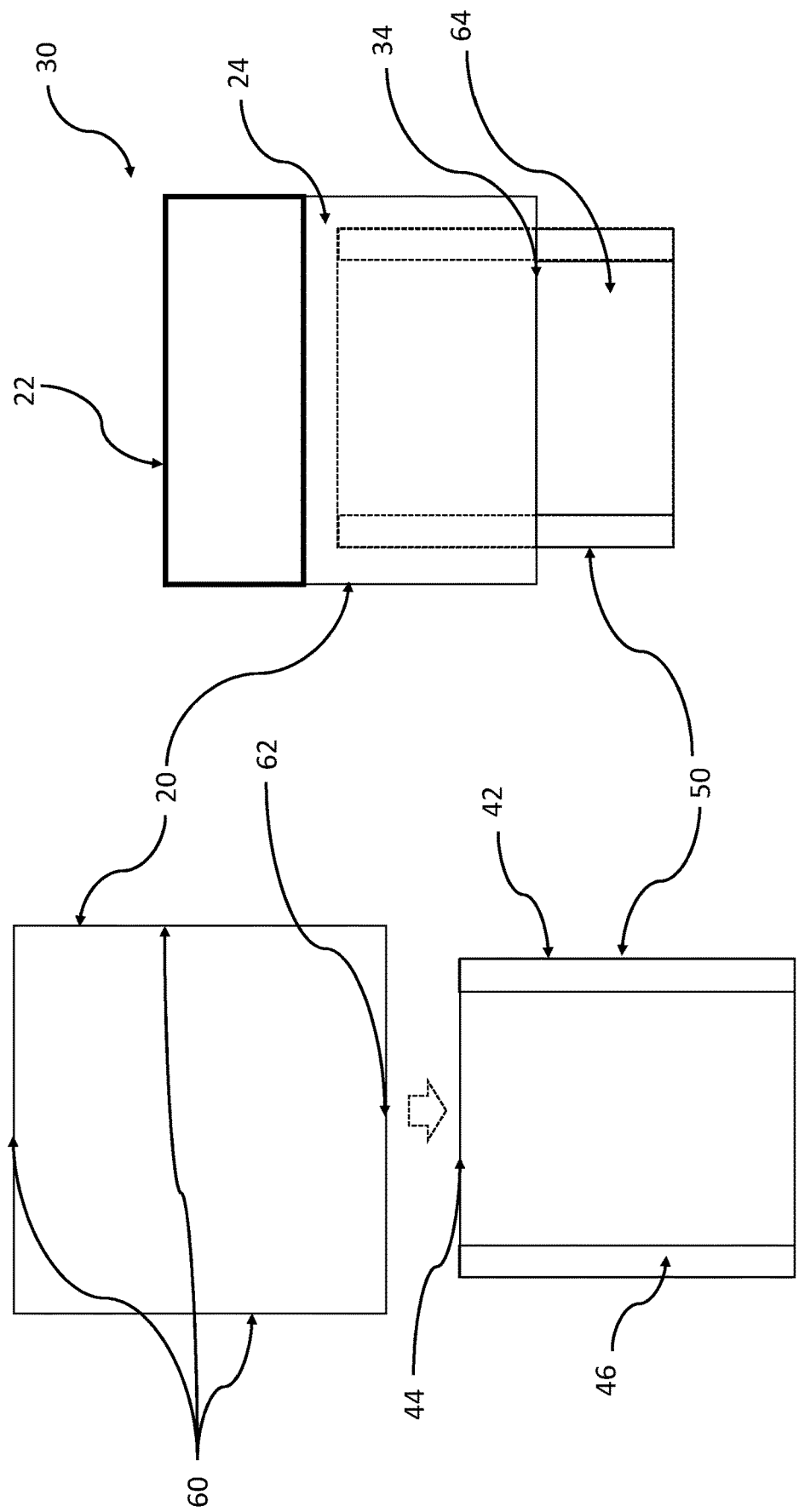
FIG. 10 is a front and side view of the pest catcher according to the present invention.
Figure 11:
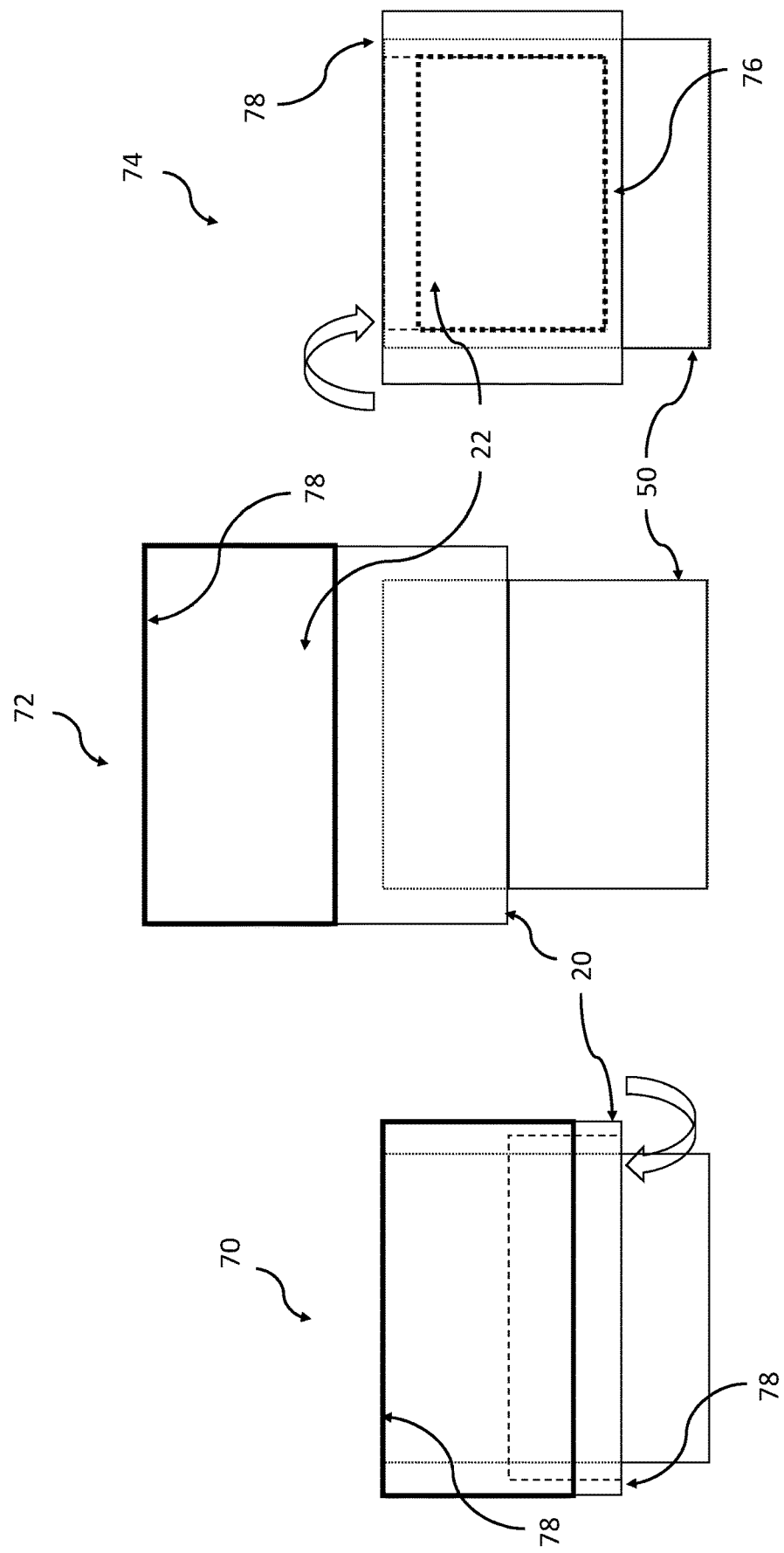

FIG. 10 shows the bag 20 of FIG. 3 being attached to the cardboard sleeve 50 of FIG. 8 to form bag unit 30. The open edge 62 of the bag 20 is placed around one short side 44 of sleeve 50 as shown by the dotted arrow. The bag 20 is secured to the sleeve by gluing an inside surface of the bag 20 to an outside surface of the sleeve 50 along the edge 62 of bag 20. The bag is coated with the sticky substance layer 22 on one side or also on the outer surface of the opposite side of the bag 20. A common double-sided tape such as a carpet tape adhered to the surface of the bag 20 has been used as the sticky substance layer 22. FIG. 11 shows the bag unit 30 of FIG. 10 can have three distinct configurations. The shipping configuration 70 of bag unit 30 is used for shipping, handling and storage of the bag unit 30 prior to placing it on the handle assembly 10. In this configuration the bag 20 is pulled down over the outside of the sleeve 50 and wrapped under itself at fold 76. Typically, a nonstick cover such as wax paper will be placed over the adhesive 22 in the shipping configuration 70 to prevent the adhesive 22 from sticking to unwanted surfaces during shipping, handling and storage of the bag unit 30. Configuration 72 shows the bag in its fully extended shape ready for the operator to capture a pest. Configuration 74 shows that the bag 20 can also be inverted or turned inside out and pulled down into sleeve 50 after the pest is captured.

Figure 12:
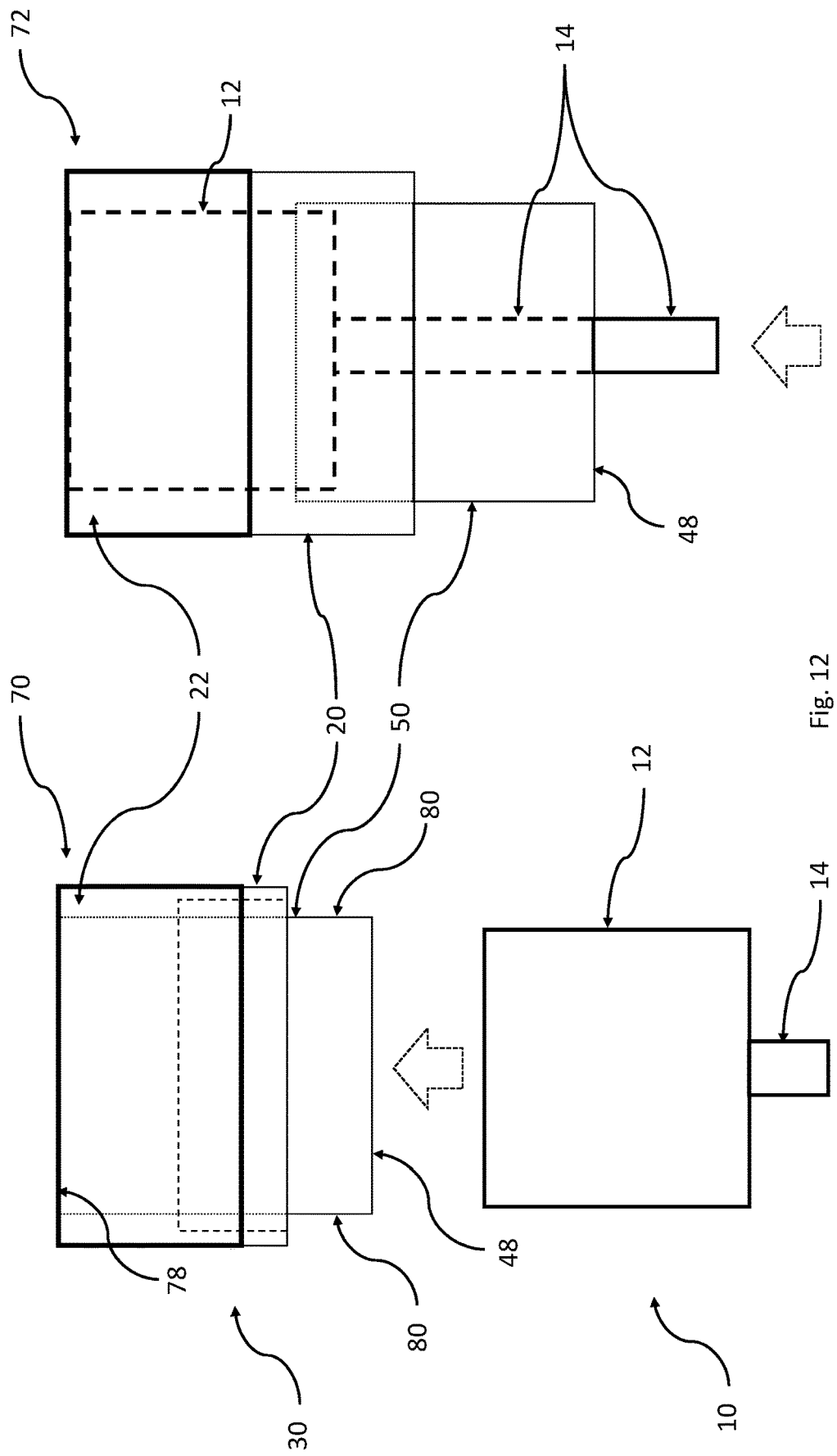
FIG. 12 is a front and side view of the pest catcher according to the present invention.

FIG. 12 shows the loading of bag unit 30 of FIG. 10 onto handle assembly 10 of FIG. 2. Before loading onto the handle head, the bag unit 30 is in configuration 70 used for shipping and handling shown in FIG. 11. The user holds sleeve 50 on its bottom edge 80 with one hand. With the other hand the operator holds handle 14 and inserts handle head 12 into the bottom sleeve opening 48 of sleeve 50. The user continues to push the handle head 12 of the handle assembly 10 upward into the inside of the cardboard sleeve 50 using the handle 14 until it emerges from the upper open end of the cardboard sleeve 50. As the top edge of handle head 12 emerges from the inside of the cardboard sleeve 50 it comes into contact with the interior edge 78 of the bag 20. The user continues to push handle head 12 up into the bag 20 using handle 14 until the bag unfolds from its shipping configuration 70 into its fully extended configuration 72 shown in FIG. 11. Once the bag 20 is fully extended, the user is not able to push handle head 12 any higher into the bag 20 because the bag 20 is adhered to the cardboard sleeve 50. Once the bag unit 30 is loaded onto the handle assembly 10 and in a fully extended, as shown by configuration 72, the bag unit 30 is ready for capturing pests.

FIG. 13 shows an insect being captured using bag unit 30 on the handle assembly of FIG. 12. The operator holds the handle 14 and captures the pest 16 sitting on a surface 18, as was described in FIG. 4. Once the pest is captured from a surface the bag unit 30 provides the ability to invert bag 20 to completely encapsulate the pest 16 to render it harmless, cause the demise of the pest and allow for disposal of the pest. The inversion of the bag 20 can be accomplished by one of many mechanical means. The bag inversion mechanism could be an integral part of the reusable handle assembly 10 or it could be part of the disposable version of bag unit 30.

Figure 14:
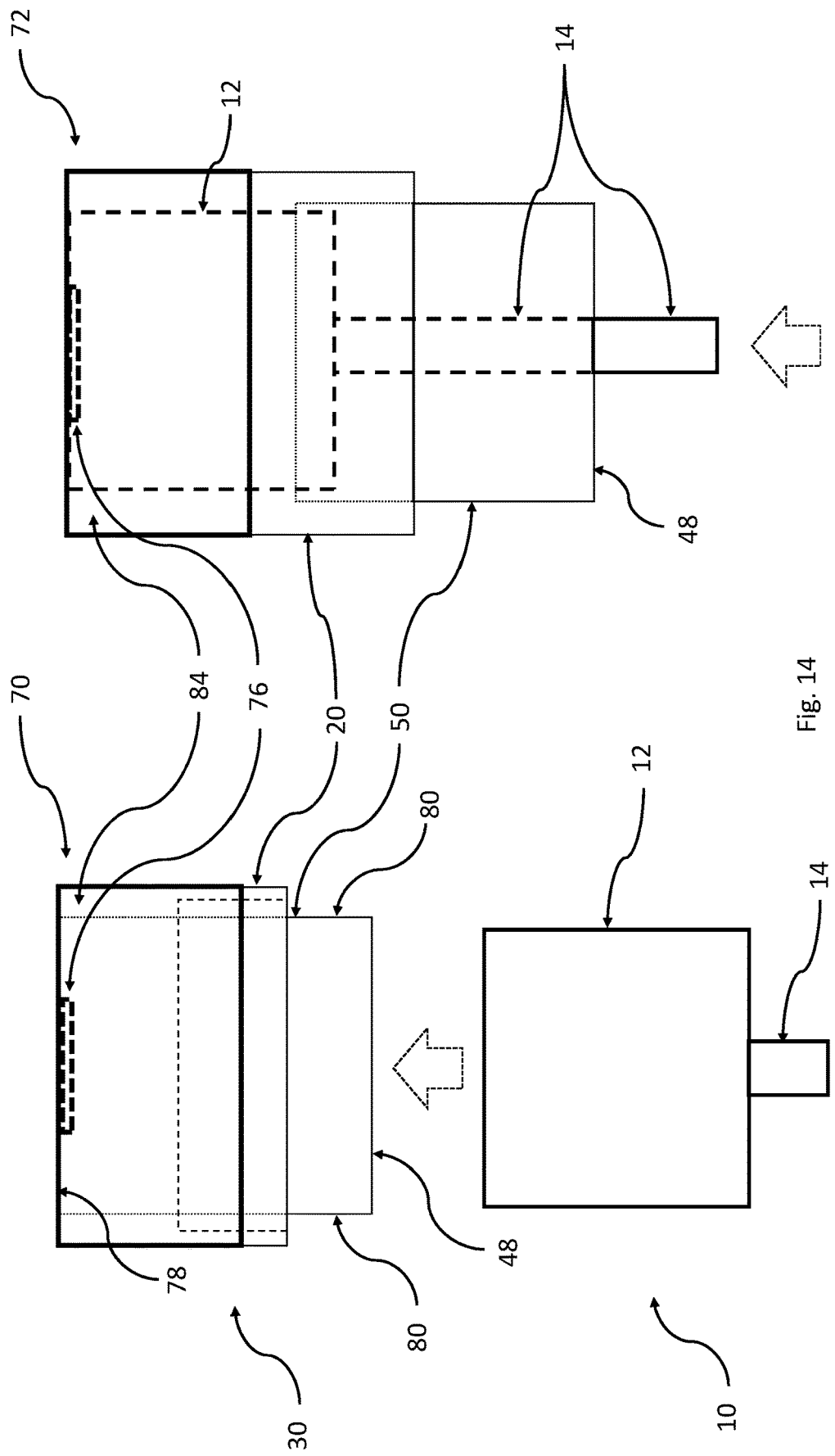
FIG. 14 is a front and side view of the pest catcher according to the present invention.

One of the simplest approaches to cause inversion of bag 20 is to use another sticky substance layer inside of the bag 20. FIG. 14 shows bag unit 30 of FIG. 12 with a sticky substance layer 84 on the interior upper edge 78 of the bag 20. When the user inserts the handle head 12 inside the sleeve 50 and pushes upward as described in FIG. 12, the top edge of handle head 12 comes into contact with the sticky substance layer 84 on the interior edge 78 of the bag 20, as handle head 12 emerges from the inside of the cardboard sleeve 50. Sticky substance layer 84 causes the interior upper edge 78 of the bag 20 to adhere to the top edge of the handle head 12.

Figure 15:
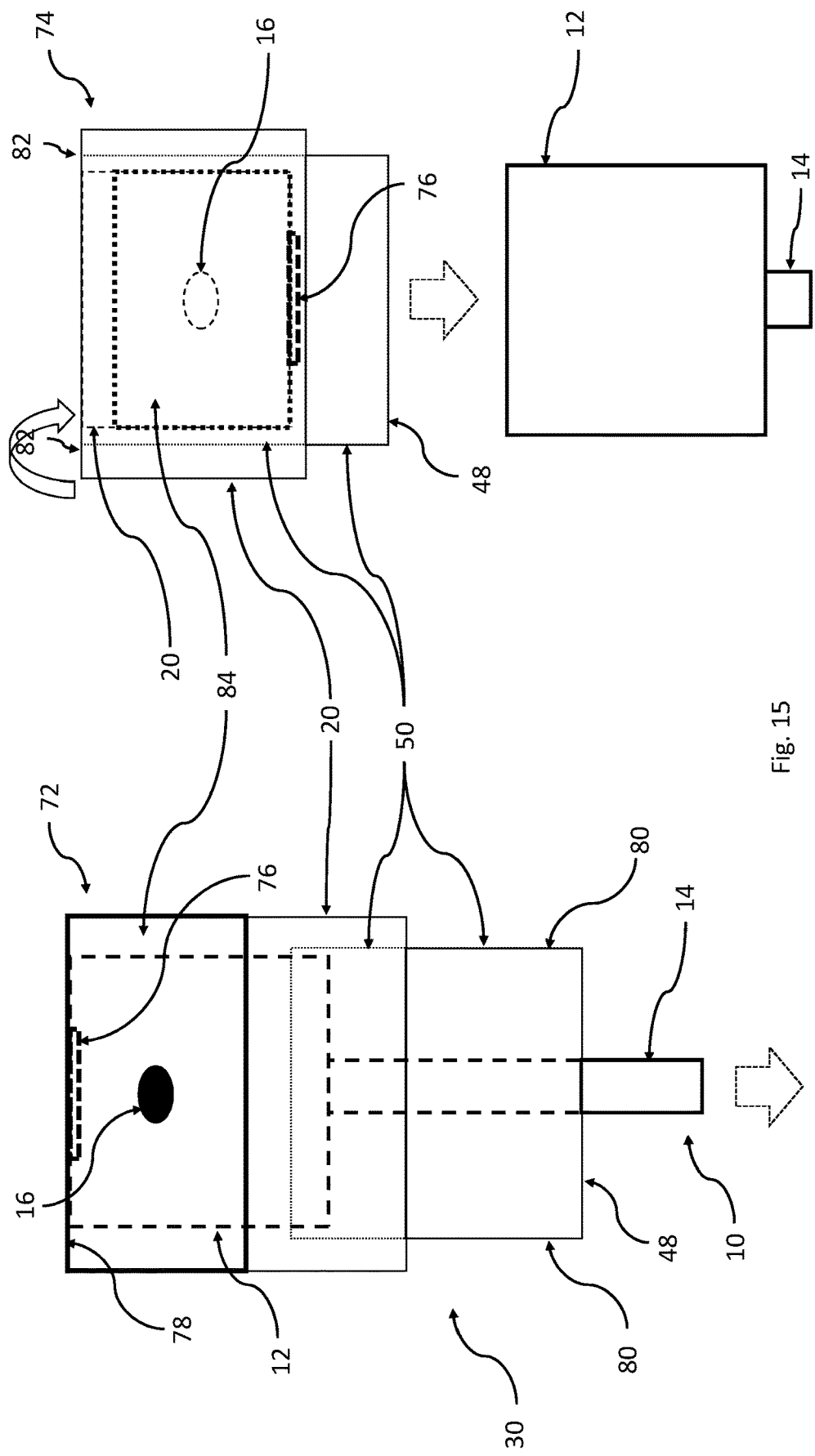
FIG. 15 is a front and side view of the pest catcher according to the present invention.
Figure 16:
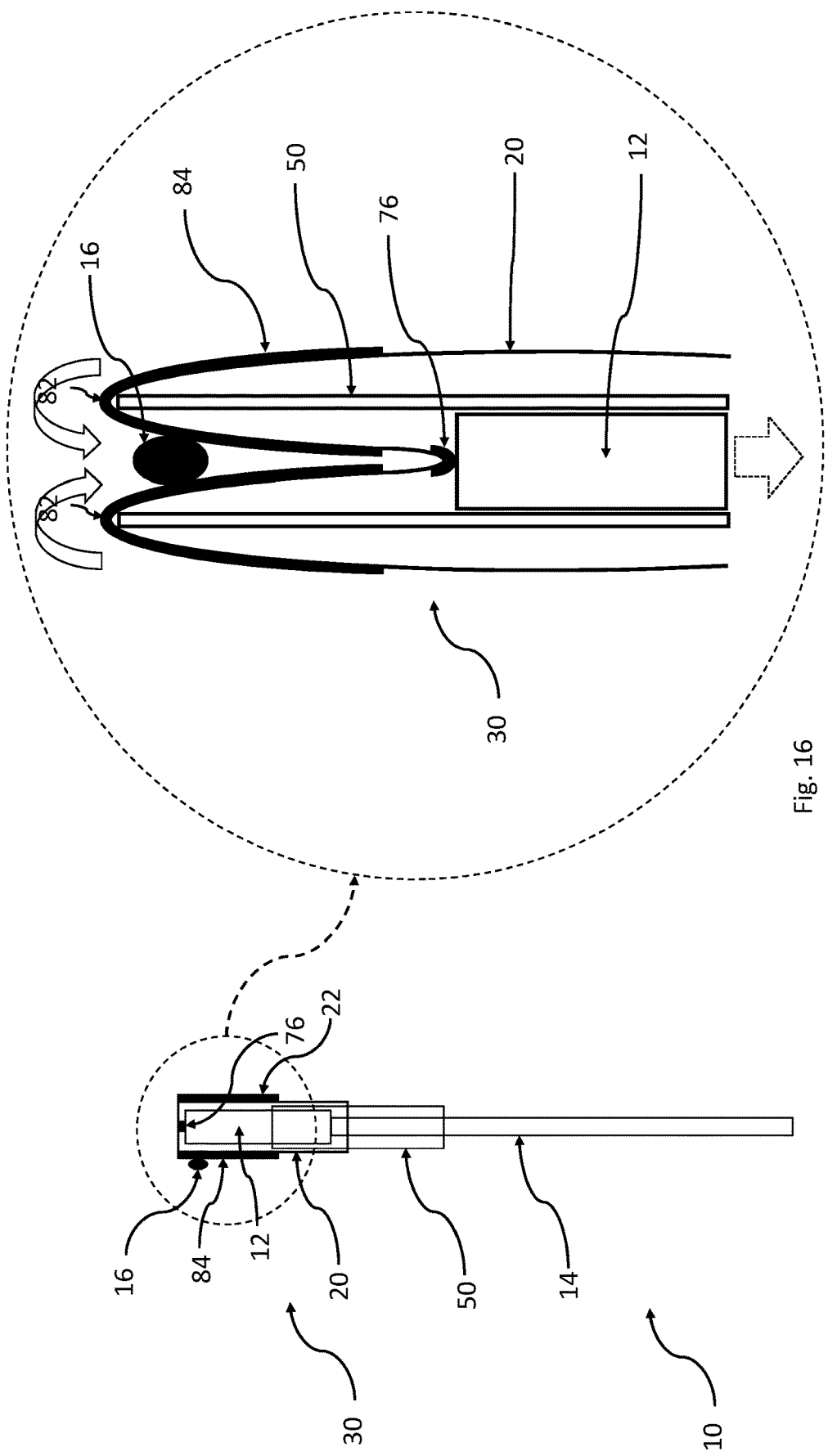
FIG. 16 is a side view of the pest catcher according to the present invention.
Figure 17:
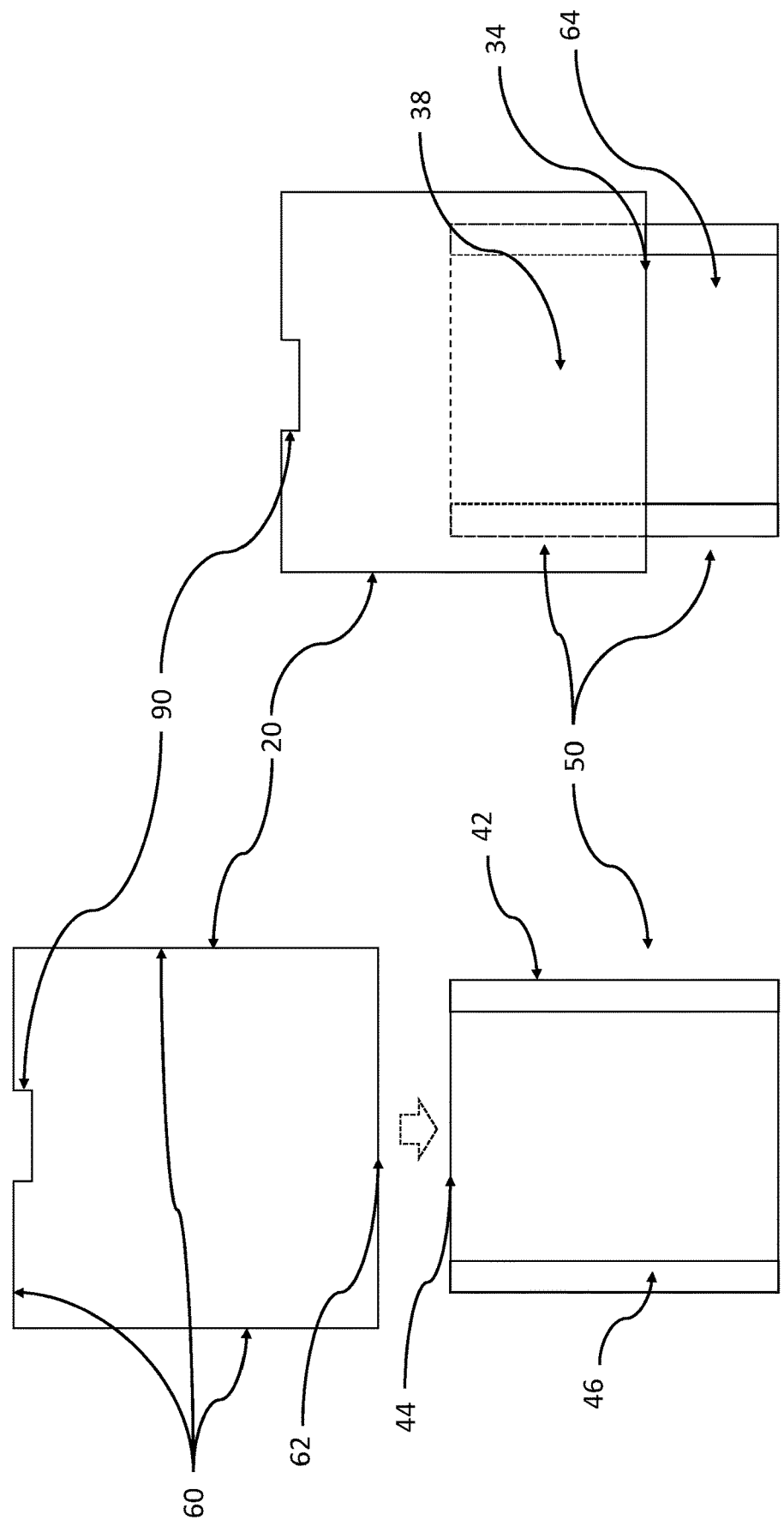
FIG. 17 is a front and side view of the pest catcher according to the present invention.

FIGS. 15 and 16 show how this sticky substance layer 84 causes the bag 20 to invert into sleeve 50 when bag unit 30 is removed from handle assembly 10 for disposal after the pest has been captured. The user holds the cardboard sleeve on its bottom exposed edges 80 with one hand and the handle 14 with the other hand. The user then pulls downward on handle 14 and pushes upward on bag unit 30, so that handle head 12 retracts downward into sleeve 50. Since the internal edge 78 is adhesively attached to the top of handle head 12 by the sticky substance layer 84, as the user pulls downward on the handle 14, the bag 20 begins to fold over into the sleeve 50 at fold points 82 and bag 20 begins to be inverted and pulled down into the cardboard sleeve 50. The user continues to pull the handle assembly 10 out of the bag unit 30 until the portion of bag which was above the sleeve 50 in the extended configuration 72 of the bag unit 30 is fully enclosed inside sleeve 50. At this point the bag cannot be pulled into the sleeve further because the open end of the bag 10 is adhesively bonded to the outer surface of the sleeve 50. As the user continues to pull the handle assembly 10 downward, the adhesive bond of the internal edge 78 to the top edge of the handle head 12 breaks and the handle assembly 10 can be completely separated from the bag unit 30, as shown in FIG. 15.

FIG. 16 shows a side view of the bag unit 30 on the handle assembly 10 after capturing pest 16 on a surface, as well as a close-up of the same trap as the handle head is being withdrawn from the bag unit 30. The pest 16 is adhered to the sticky substance layer 22 on one side of the bag 20. The bag 20 also has a sticky surface layer its opposite side as shown in FIG. 16. FIG. 16 shows the sticky substance layer 84 which adheres the inside upper edge of the bag 20 to the top edge of the handle head 12. FIG. 16 shows that as handle head 12 of handle assembly 10 is pulled out of the sleeve by the user, the plastic bag is inverted and pulled down into the sleeve 50. As the bag 20 is inverted and pulled downward into sleeve 50, this action causes the pest 16 to be pulled down with the bag 20. As the pest 16 is pulled down into sleeve 50, the sticky substance layer 22 on the opposite side of the bag 20 also contacts the pest 16. This action of the sticky substance layers 22 on both sides of the bag 20 surrounds the pest in the sticky substance layers 22 to prevent escape. The pest 16 is surrounded and secured by the sticky substance layers 22 inside of the bag 20 which have been inverted inside the sleeve 50.

Once the bag unit 30 is removed from handle assembly 10, the user can place bag unit 30 on the floor and step on the bag unit 30 to ensure the pest is crushed and securely held in the adhesive on all sides. Alternatively, the user can throw bag unit 30 directly into the trash receptacle without stepping on it. A new bag unit 30 can then be installed on the handle assembly 10 for capturing additional pests. The bag unit 30 allows the user to remove the bag 20 without touching the bag 20 or the pest 16 adhered to the bag 20. If the user has an extreme phobia to a pest 16 adhered to the bag 20, the user can use a rod to push the bag unit 30 off and into a trash receptacle, thereby increasing the distance between the user and the pest 16. The rod can be separate from the handle assembly 10 or handle assembly 10 could have a mechanism attached to the handle assembly 10 with a push rod that accomplishes this removal.

Figure 18:
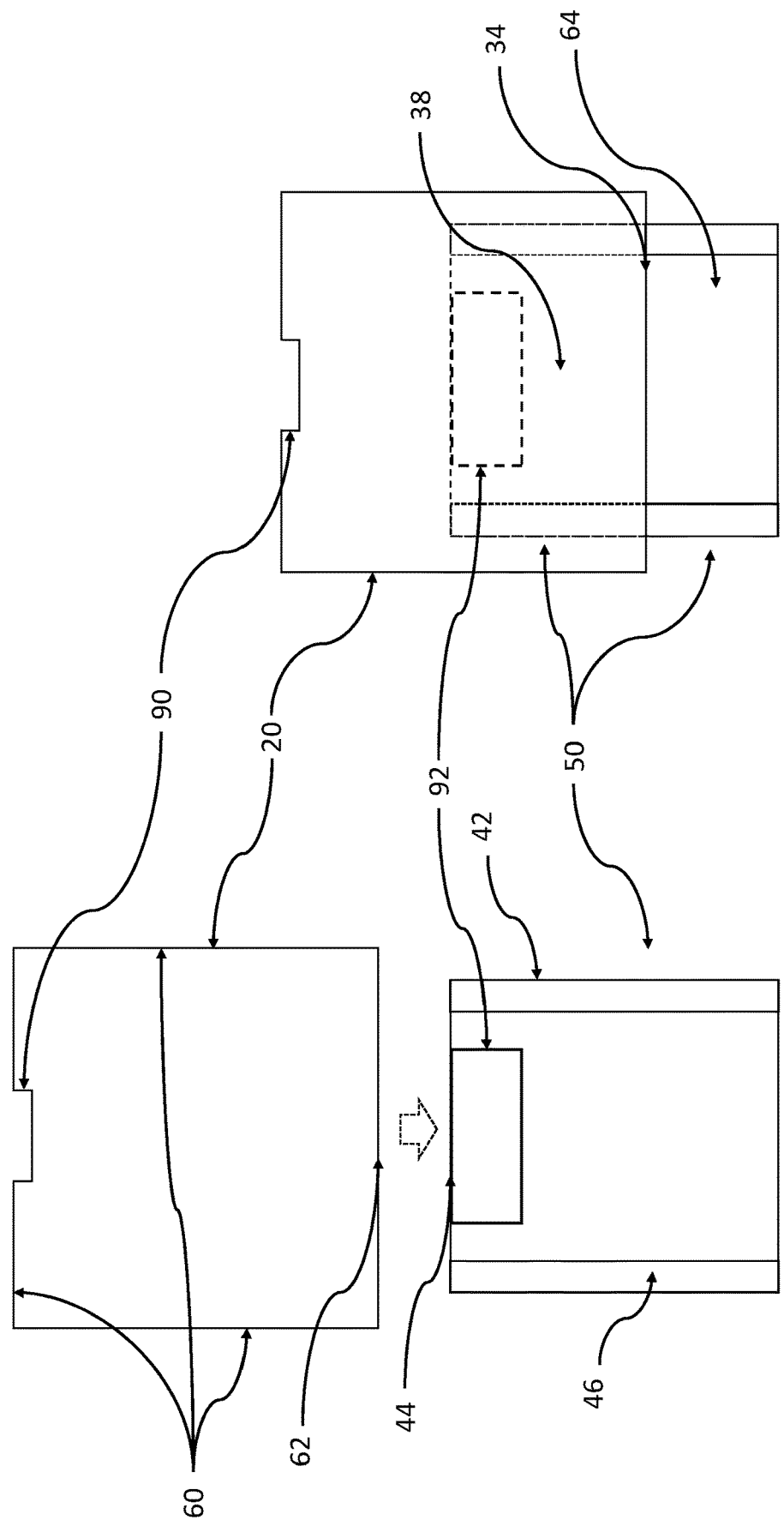
FIG. 18 is a front and side view of the pest catcher according to the present invention.
Figure 19:
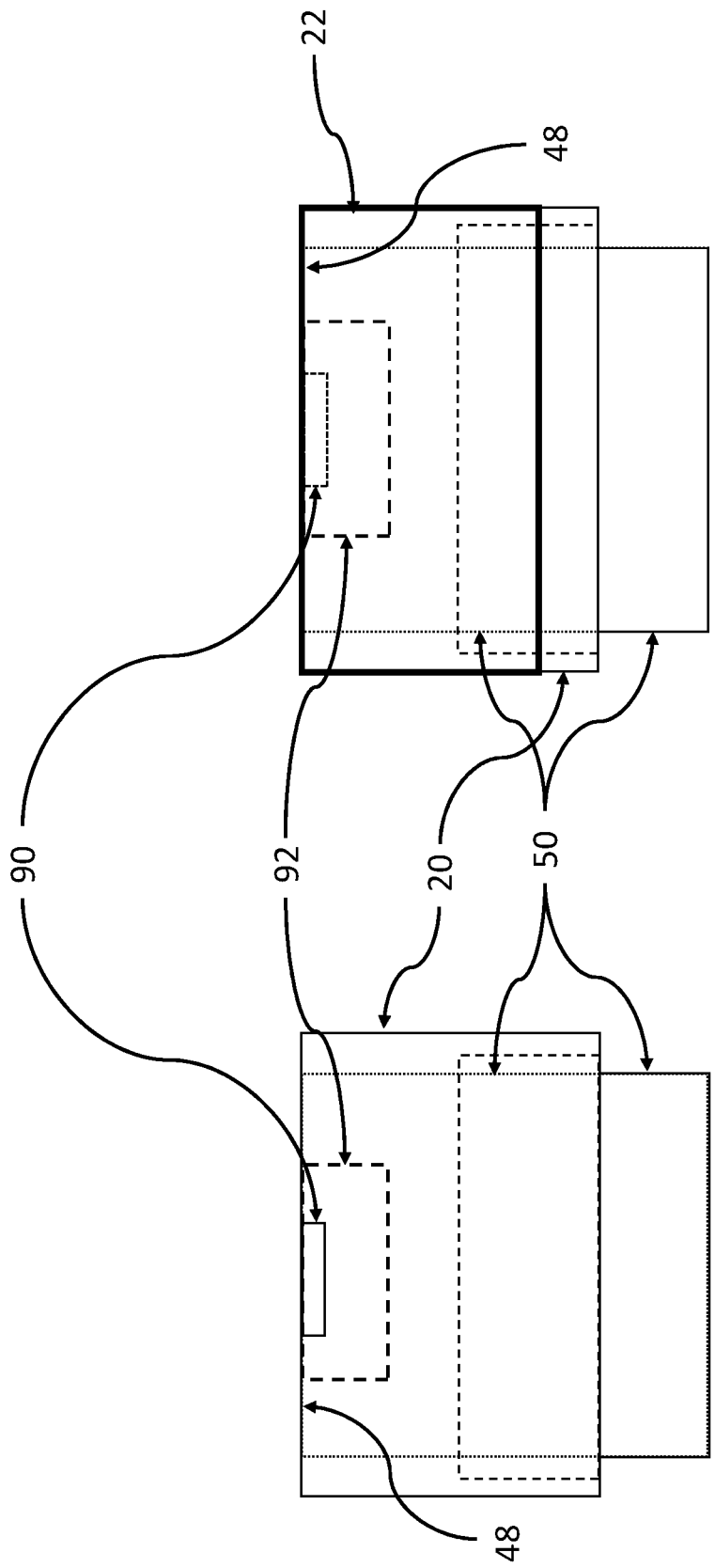
FIG. 19 is a front and side view of the pest catcher according to the present invention.

Using a sticky substance layer 84 on the interior upper edge 78 of the bag 20 is a very simple and low cost means for causing the bag 20 to invert and be pulled down into sleeve 50. This approach however presents some technical challenges in the construction of bag unit 30. The first technical challenge in bag unit 30 construction is that it is difficult to coat a small portion of the interior upper edge 78 of the bag 20 with the sticky substance layer 84 without getting the sticky substance to adhere to other surfaces of the bag 20 that might to stick to itself or to the cardboard sleeve that supports it. A simple and inexpensive way to solve this problem is to allow the same sticky substance layer 22 applied to the outer surface of the bag for capturing the pest to also function as the sticky substance layer 84 for adhering the bag 20 to the handle head of the handle assembly 10. This is accomplished by cutting a slot in the bag 20 before the sticky substance layer 22 is applied to the outside surface of the bag 20. FIG. shows the same assembly process of FIG. 10, but this time with a slot 90 cut into the upper edge 60 of bag 20 before the bag 20 is attached to the cardboard sleeve 50. After the bag 20 is attached the sleeve 50, double-sided carpet tape can then be applied to the surface of bag 20 to act as the sticky substance layer 22. When double-sided tape is applied to the bag 20 with the slot 90 cut into the bag 20, the adhesive on the underside of the double-sided tape will be exposed on the interior upper edge 78 of the bag 20. This exposed adhesive on the underside of the double-sided tape then acts as the sticky substance layer 84 on the interior upper edge 78 of the bag 20 that adheres to the handle head 12 of the handle assembly 10 as the handle is inserted into the bag unit 30. There is a technical difficulty that is encountered with the slotted bag approach. When the bag unit 30 is in the fully extended configuration 72 shown in FIG. 9, the sticky substance layer 84 on the inside upper edge of the bag 20 would stick to other undesirable surfaces when the bag 20 was folded down into the shipping configuration shown in FIG. 9. The sticky substance layer 84 on the inside upper edge of the bag would stick to internal portions of the bag 20 and external portions of sleeve 50. This undesirable adhesion of sticky substance layer 84 to other surfaces makes it difficult to fold the bag 20 down into the shipping configuration 70 and makes the bag unit 30 improperly open when the bag unit 30 was placed on the handle assembly 10, when the bag 20 is extended to the fully extended configuration 72. To overcome these difficulties another feature was added to the cardboard sleeve 50 to keep the sticky substance layer 84 on the inside upper edge of the bag 20 from sticking to other surfaces. FIG. 18 shows a nonstick coating 92 is first applied to the upper edge of both the front surface and rear outer surfaces of sleeve 50 before bag 20 is attached to sleeve 50. Once the nonstick coating 92 and the bag 20 with slot 90 are attached to sleeve 50 the bag 20 is then folded down into the shipping configuration 70 as shown in FIG. 19 before the double-sided tape is applied to bag 20 to form the sticky substance layer 22. In the shipping configuration 70 of FIG. 19, the slot 90 cut into bag 20 is positioned directly over the non-stick coating 92. In this way, the adhesive on the underside of the double-sided tape will not adhere to the cardboard sleeve 50 when the double-sided tape is applied to the outside of the bag 20.

FIG. 19 shows the double-sided tape is then applied to the exterior of bag 20 so that the adhesive on the top side of the double-sided tape functions as sticky coating 22 and the adhesive on the bottom side of the double-sided tape functions as the sticky substance layer 84 on the inside upper edge of the bag 20. The bag unit 30 is completed in the shipping configuration 70, so that the bag 20 does not need to be folded down over sleeve 50 after the double-sided tape is applied. The bag unit 30 is now ready for shipping to the customer and then insertion onto the handle assembly 10 for use by the user as described in FIG. 14. As the handle assembly 10 is inserted into bag unit 30, the top edge of handle head 12 of handle assembly 10 will emerge from the inside of the cardboard sleeve 50 and come into contact with the interior edge 78 of the bag 20 and the exposed adhesive on the bottom of the double-sided tape on the interior edge 78.

Figure 20:
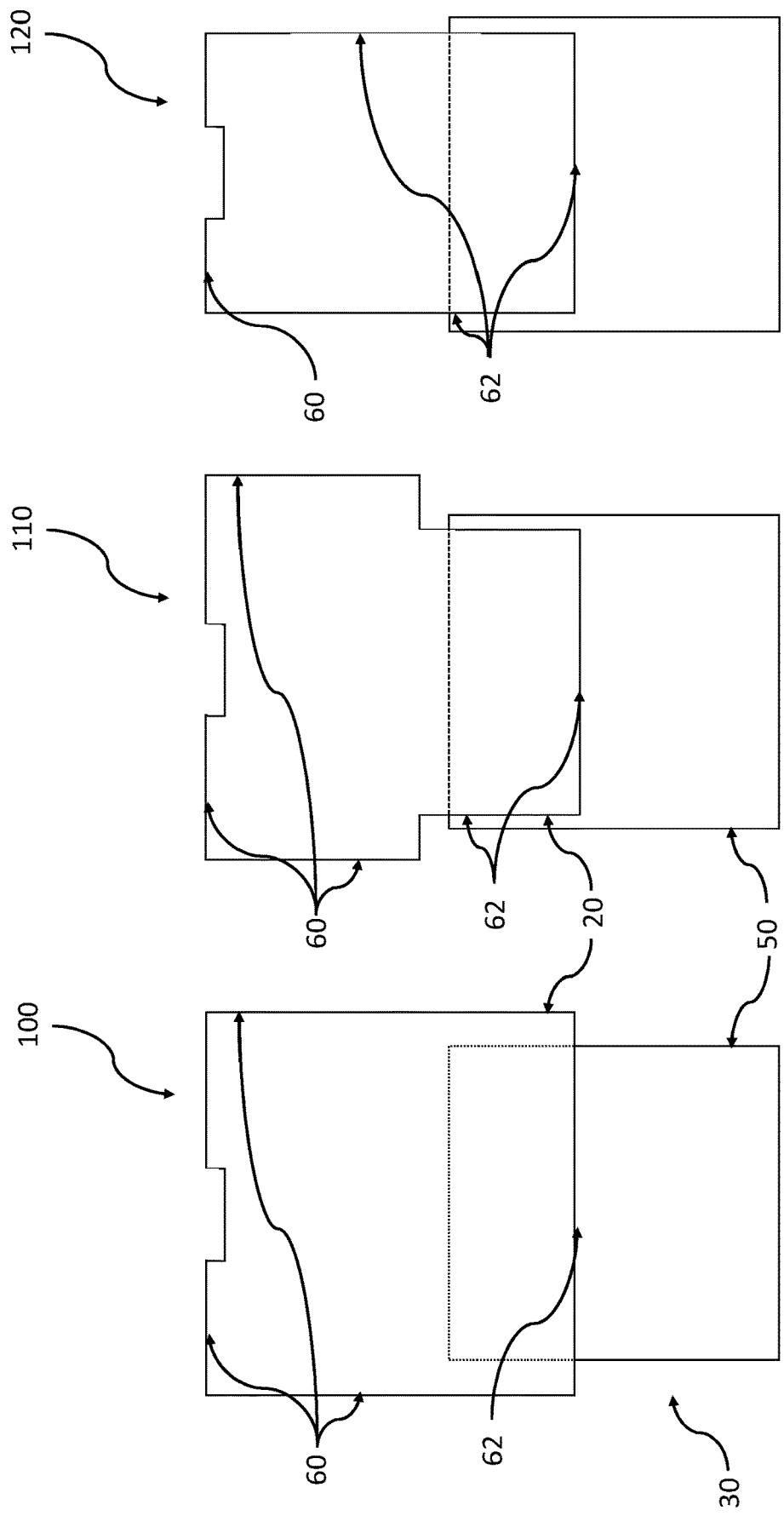
FIG. 20 is a front and side view of the pest catcher according to the present invention.

There are many possible variations of this invention. The bag 20 can be made from a variety of materials including plastic, rubber or paper. Plastic is preferred for most bags 20 because it is strong, flexible, opens into the extended configuration easily and retains its shape. The bag 20 of bag unit 30 can be of also be of various shapes and sizes. FIG. 20 shows the three main variations of bag 20 on bag unit 30, but bag 20 could be shaped to any variation in between these three main versions. A full bag 100 version is what has been shown for bag 20 in bag unit 30 throughout the discussion. Partial bag 110 uses a bag in which the nine-inch-long side edges are open sides 62 on both sides of the bag 110 part way up the nine-inch-long sides. This partial bag 110 variation of the bag 20 is easier to fold down onto sleeve 50 from the extended configuration 72 to the shipping configuration 70. It also extends more easily from configuration 70 to configuration 72 when the trap is placed on the handle assembly 10. Open sided bag 120 configuration has fully open sides 62 on three edges of bag 20 and is only closed 60 on the upper edge. This would be the lowest cost version of the bag unit 30 since the bag 20 is essentially a strip of material, however it may not contain the pest as well. Another disadvantage of open sided bag 120 is that it might easily slide off of handle head 12 of the handle assembly 10 during the capturing of pests. The full bag 100 and partial bag 110 have three sides around the handle head 12 of handle assembly 10 which causes them to be more securely held by handle head 12 and unable to slide sideways off of handle head 12 during capturing of the pest. Sleeve 50 of bag unit 30 could be made of a variety of materials including paper, plastic or cardboard.

The support 32 for the bag 20 can be part of either the disposable bag unit 30 or the reusable handle assembly 10. The disposable bag unit 30 could consist of bag 20 only with no support element 32. Rather the support for bag 20 could be a feature of the reusable handle assembly 10. The disposable bag 20 would then consist of only a bag 20 that would be placed on and held by the handle assembly 10. In this case a mechanical means for inverting the bag 20 could also be an element of the reusable handle assembly 10. The pest catcher could be designed so that pests are completely pulled into the inverted bag 20 as discussed so far. But the pest catcher could be also designed to only capture the head of a larger pest such as a snake. The bag 20 could be adhered to the outside surface of the head of the snake and then designed to pull the head into a bag similar to the way the pest was pulled into the bag as shown in FIG. 16. The handle assembly 10 could be designed with other features to push the bag around the head of the pest, while it draws the head into the bag 20. Many dangerous pests such as snakes can be essentially made harmless and suffocated by simply pulling the head of the pest into the bag 20 making it unnecessary to have a bag large enough to enclose the whole body of the pest. Alternatively, however, a large size version of the invention could be used to pull the entire body of a larger pest into bag 20.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A pest catcher adapted to catch and contain a pest, comprising:
   a bag adapted to catch and contain the pest, said bag having a top, bottom and at least one side, said bottom of said bag having a bag support opening;
   a head to manipulate said bag;
   a handle attached to said head, said handle for manipulating said head and said bag;
   a disposable bag support to receive a portion of said bag having a top, bottom and at least one side, said top and said bottom of said bag support each having an opening to allow said head to slide through said bag support, said top of said bag support partially inserted into said bag support opening of said bag and inside of said bag, said top of said bag support secured to an inside surface of said bag near said bag support opening before insertion of said head into said bag support so that said bag remains attached to said bag support during use and allows said head to slide into said bag to expand said bag for use;
   a sticky substance with adhesive properties attached to said bag, said sticky substance facing outward from said head that is adapted to contact the pest during the capture phase of the use of said pest catcher an engagement member between said head and inside of said bag so that said bag is attached to said head by said engagement member after insertion of said head in said bag to allow said top of said bag to be inverted inside out to encapsulate the pest.

2. The pest catcher of claim 1, further including a tool to invert said bag inside out to encapsulate the pest.

3. The pest catcher of claim 1, wherein said bag is attached to said head by said engagement member to allow the pulling of said bag into said opening of said bag support after use of said pest catcher by retraction of said head within said opening of said bag support.

4. The pest catcher of claim 1, wherein said engagement member is an adhesive layer between said inside of said bag and said head in order to attach said bag to said head when said head contacts said bag.

5. The pest catcher of claim 4, wherein said bag includes a slot and said adhesive layer is over said slot so that said adhesive layer contacts said head when said head is in an area of said slot to provide said attachment of said bag to said slot.

\* \* \* \* \*